US005397674A

United States Patent [19]

Ozaki et al.

[11] Patent Number: 5,397,674

[45] Date of Patent: Mar. 14, 1995

[54] RADIATION SENSITIZED PAPER

[75] Inventors: Yoshihide Ozaki, Tokyo; Satoshi Otonari, Nagahama; Masahiro Kita, Sakata, all of Japan

[73] Assignee: Diafoil Hoescht Company Limited, Tokyo, Japan

[21] Appl. No.: 991,971

[22] Filed: Dec. 17, 1992

[30] Foreign Application Priority Data

Dec. 19, 1991 [JP] Japan .................................. 3-337302

[51] Int. Cl.$^6$ .................................................. B32B 9/00

[52] U.S. Cl. ..................................... 430/139; 430/502; 430/531; 430/966; 428/690; 428/691; 252/301.36

[58] Field of Search .................... 430/139, 966, 6, 527, 430/528; 428/690, 691; 252/301.36

[56] References Cited

U.S. PATENT DOCUMENTS

| | | | |
|---|---|---|---|
| 3,580,720 | 5/1971 | Ohyama | 96/82 |
| 3,591,379 | 7/1971 | Plakunov | 96/50 |
| 4,048,357 | 9/1977 | Van Paesschenet | 430/966 |
| 4,415,471 | 11/1983 | Degenhardt | 252/301.36 |
| 4,675,271 | 6/1987 | Degenhardt | 430/139 |
| 4,916,011 | 4/1990 | Miller | 428/341 |

FOREIGN PATENT DOCUMENTS 0128592 12/1984 European Pat. Off. .

OTHER PUBLICATIONS

Abstract—JP-A-3 028 799 Derwent Publications Ltd., Feb. 1991.

Abstract—JP-A-2 276 999 Derwent Publications Ltd., Nov. 1990.

Abstract—JP-A-60 175 000 Derwent Publications Ltd., Sep. 1985.

*Primary Examiner*—Patrick J. Ryan

*Assistant Examiner*—Kam F. Lee

*Attorney, Agent, or Firm*—Foley & Lardner

[57] ABSTRACT

A radiation sensitized paper having a polyester film, a coating layer which contains a water-soluble or water-dispersible resin and is formed on a surface of the polyester film, a resin layer which is formed on the coating layer and a fluorescent material layer which is formed on the resin layer, in which adhesion of the fluorescent material layer is good.

20 Claims, No Drawings

RADIATION SENSITIZED PAPER

BACKGROUND OF THE INVENTION

1. Field of the Invention

The present invention relates to a radiation sensitized paper (hereinafter referred to as "sensitized paper").

2. Description of the Related Art

The sensitized paper is used with being adhered to an X-ray film to improve sensitivity of a photography system in medical radiographing such as X-ray photographing or industrial radiographing for the purpose of non-destructive inspection of a material.

A typical sensitized paper comprises a polyester film and a $CaWO_4$ fluorescent material layer laminated thereon. Since adhesion between the polyester film and the fluorescent material layer is not good, the fluorescent material layer tends to be peeled off during the production or use of the sensitized paper, so that a yield of the product or the number of uses is decreased. To improve the adhesion between the polyester film and the fluorescent material layer, the polyester film is treated with corona discharge, or a primer layer is provided. However, since the fluorescent material particles are filled-and dispersed in a binder of the fluorescent material layer at a high density, the fluorescent material layer is peeled off, when the sensitized paper is folded.

When a thickness of the fluorescent material layer is increased to improve the photographic sensitivity, the adhesion of the fluorescent material layer to the base film is still insufficient in the above method. Then, further improvement of the adhesion of the fluorescent material layer to the base film has been desired.

SUMMARY OF THE INVENTION

An object of the present invention is to provide a radiation sensitized paper having improved adhesion between a base film and a fluorescent material layer.

According to the present invention, there is provided a radiation sensitized paper comprising a polyester film, a coating layer which comprises a water-soluble or water-dispersible resin and is formed on a surface of said polyester film, a resin layer which is formed on said coating layer and a fluorescent material layer which is formed on said resin layer.

DETAILED DESCRIPTION OF THE INVENTION

In the present invention, the polyester is intended to mean a polyester which is prepared by polycondensating an aromatic dicarboxylic acid (e.g. terephthalic acid, isophthalic acid, naphthalene dicarboxylic acid, etc.) or its ester with a glycol (e.g. ethylene glycol, diethylene glycol, 1,4-butanediol, neopentyl glycol, 1,4-cyclohexanedimethanol, etc.).

The polyester comprising the acid component and the glycol component may be prepared by any of the conventional methods. For example, a lower alkyl ester of the aromatic dicarboxylic acid is transesterified with the glycol or the aromatic dicarboxylic acid and the glycol are directly esterified to obtain a bisglycol ester of the aromatic dicarboxylic acid or its low molecular weight polymer, which is then polycondensated at a temperature not higher than 240° C. under reduced pressure. In this production method, a conventional additive such as a catalyst, a stabilizer and the like may be used.

Examples of the polyester are polyethylene terephthalate, polyethylene naphthalate, poly-1,4-cyclohexylenedimethylene terephthalate, and the like. The polyester may be a homopolymer or a mixed polyester.

In the polyester, a light-absorbing material such as carbon black or a light-reflecting material such as titanium dioxide, calcium carbonate or barium carbonate may be compounded.

The polyester film may optionally contain a stabilizer, a UV-light absorber, a lubricant, a pigment, an antioxidant, a plasticizer and an antistatic agent.

Examples of the water-soluble or water-dispersible resin are starch, cellulose derivatives (e.g. methylcellulose, hydroxycellulose, etc.), alginic acid, gum arabic, gelatin, polysodium acrylate, polyacrylamide, polyvinyl alcohol, polyethylene oxide, polyvinylpyrrolidone, urethane resin, acrylic resin, polyamide resin, ether resin, epoxy resin, ester resin, styrene-butadiene copolymer, acrylonitrile-butadiene copolymer, and the like. Among them, the urethane resin, acrylic resin, polyester resin and styrene-butadiene copolymer are preferred.

As the urethane resin, a water-soluble or water-dispersible urethane resin prepared from polyisocyanate, a polyol, a chain extender and a crosslinking agent is preferably used. To make the urethane resin water-soluble or water-dispersible, it is conventional to introduce a hydrophilic group in at least one of the polyisocyanate, the polyol and the chain extender. It is also well known to react the unreacted isocyanate groups of the polyurethane with a compound having a hydrophilic group.

As the acrylic resin, there is preferably used a water-soluble or water-dispersible acrylic resin which is prepared by copolymerizing an alkyl acrylate or methacrylate with a vinyl monomer having a reactive functional group such as a carboxyl group or its salt form, an acid anhydride group, a sulfonic acid group or its salt form, an amido group, an amino group, a hydroxyl group or an epoxy group.

Examples of the dicarboxylic acid component of the polyester resin are aromatic dicarboxylic acids (e.g. terephthalic acid, isophthalic acid, 2,6-naphthalenedicarboxylic acid, etc.), aliphatic dicarboxylic acids (e.g. adipic acid, azelaic acid, sebacic acid, etc.), hydroxycarboxylic acids (e.g. hydroxybenzoic acid, etc.), and their ester-forming derivatives.

Examples of the glycol component of the polyester resin are aliphatic glycols (e.g. ethylene glycol, 1,4-butanediol, diethylene glycol, triethylene glycol, etc.), alicyclic glycols (e.g. 1,4-cyclohexanedimethanol, etc.), poly(oxyalkylene) glycols (e.g. polyethylene glycol, polypropylene glycol, polytetramethylene glycol, etc.) and the like.

The polyester resin includes not only a saturated linear polyester comprising the above described ester-forming components but also one comprising, as a polyester component, a compound having tri- or higher functional ester-forming component or a compound having a reactive unsaturated group. Preferably, the polyester resin has a functional group for improving solubility or dispersibility in water such as a sulfonic acid group, a carboxylic acid group, a phosphoric acid group or their salts.

Examples of the styrene-butadiene copolymer are a SBR latex containing 0 to 30% by weight of styrene, a SB latex containing 40 to 70% by weight of styrene, a modified latex containing at least one additional monomer in addition to styrene and butadiene.

The above exemplified resins may be used in combination.

In order to improve a blocking property, water resistance, solvent resistance or mechanical strength of the coating layer, a coating composition containing the water-soluble or water-dispersible resin according to the present invention may contain, as a crosslinking agent, a methyloled or alkyloled urea, melamine, guanamine, acrylamide or polyamide, an epoxy compound, an aziridine compound, blocked polyisocyanate, a silane coupling agent, a titanium coupling agent, a zirco-aluminate coupling agent, a peroxide, a heat or photoreactive vinyl compound, or a photosenstive resin.

To improve the blocking property or a slipping property, the coating composition may further contain inorganic particles such as silica, silica sol, alumina, alumina sol, zirconium sol, kaolin, talc, calcium carbonate, calcium phosphate, titanium oxide, barium sulfate, carbon black, molybdenum disulfide, antimony oxide sol, and the like.

If necessary, the coating composition may contain a foam-inhibitor, a coating property improver, a tackifier, an antistatic agent, an organic lubricant, organic polymer particles, an antioxidant, a UV-light absorber, a foaming agent, a dye, a pigment, and the like.

The coating composition can be coated on the polyester film by a conventional method, for example, with a reverse roll coater, a gravure coater, a rod coater, an air doctor coater or the like, after or during biaxially orienting the polyester film. Preferably, the coating composition is applied to the polyester film in the biaxial orienting step. For example, the coating composition is applied on the unoriented polyester film and then the polyester film is biaxially oriented successively or simultaneously, or the coating composition is applied to the uniaxially oriented polyester film and then the polyester film is oriented in a direction perpendicular to the direction of the previous uniaxial orientation. Further, the coating composition can be applied to the biaxially oriented polyester film and then the polyester film is again biaxially oriented.

The orientation of the polyester film is carried out preferably at a temperature of 60° to 130° C. A draw ratio is at least 4 times, preferably 6 to 20 times in terms of an area ratio. The oriented film may be heat treated at a temperature of 150° to 250° C.

Preferably, the oriented film shrinks by 0.2 to 20% in a machine direction and a cross direction at the maximum temperature zone in the heating step and/or a cooling zone at an exit in the heating step.

In particular, preferably the coating composition is coated on a uniaxially oriented polyester film which has been oriented at a draw ratio of 2 to 6 by a roll orientation method at a temperature of 60° to 130° C., and optionally dried, and then immediately the uniaxially oriented polyester film is oriented in a direction perpendicular to the direction of the previous orientation at a draw ratio of 2 to 6 at a temperature of 80° to 130° C., followed by heat treatment at a temperature of 150° to 250° C. for 1 to 600 seconds.

According to the present invention, the coated composition is dried at the same time as the orientation, and the thickness of the coating layer is made thin depending on the draw ratio of the polyester film, whereby a film suitable as a base material is produced at a low cost.

The coating composition may be applied on one surface or the both surfaces of the polyester film. When the coating composition is applied on only one surface, on the opposite surface, a coating composition which is different from the coating composition of the present invention may optionally be applied to impart other property to the radiation sensitized paper of the present invention.

To improve the coating property or the adhesion of the coating composition to the film, the polyester film can be chemically treated or electrically discharged before the application of the coating composition. Further, to improve the adhesion or the coating property of the coating layer, the coated film may be electrically discharged after the formation of the coating layer.

A thickness of the coating layer-is from 0.01 to 5 $\mu$m, preferably from 0.02 to 1 $\mu$m. When the thickness of the coating layer is less than 0.01 $\mu$m, it is difficult to form a uniform layer so that the coating irregularity may be generated in the product.

On the coating layer containing the water-soluble or water-dispersible resin, a resin layer is formed.

Examples of the resin in the resin layer are polyvinyl butyral, polyvinyl acetal, polyester, polyester-grafted polyacrylate, nitrocellulose, cellulose acetate, polyurethane, vinyl chloride-vinyl acetate copolymer, and the like. They may be used in combination.

The resin layer preferably contains inorganic particles such as silica, alumina, calcium carbonate, titanium oxide, and the like to improve the blocking and slipping properties.

Further, the resin layer may contain a crosslinking agent such as an isocyanate compound or an epoxy compound to improve the blocking property, solvent resistance and mechanical strength.

If necessary, the resin layer may contain a foam-inhibitor, a coating property improver, a tackifier, an antistatic agent, an organic lubricant, organic polymer particles, an antioxidant, a UV-light absorber, a foaming agent, a light-absorbing agent, a light-reflecting agent, a pigment, and the like.

Thought the resin layer may be laminated by extruding the resin, it is preferably formed by dissolving the resin in a solvent to prepare a solution having a suitable viscosity, applying the solution on the coating layer containing the water-soluble or water-dispersible resin and drying the solution.

The resin layer may be formed in or out of the production steps of the polyester film.

A thickness of the resin layer is preferably from 0.1 to 50 $\mu$m, more preferably from 1 to 20 $\mu$m. When this thickness is less than 0.1 $\mu$m, the adhesion of the resin film to the fluorescent material layer which is subsequently formed is deteriorated. When this thickness is larger than 50 $\mu$m, the adhesion of the resin layer to the already formed coating layer is deteriorated.

The surface of the resin layer has a center line average surface roughness (Ra) of preferably from 0.01 to 2 $\mu$m, more preferably from 0.05 to 1 $\mu$m. When Ra is less than 0.01 $\mu$m, the surface slipping property may be insufficient and the workability may be decreased. When Ra exceeds 2 $\mu$m, the resolution of the X-ray photograph tends to be worsened.

Then, the fluorescent material layer is formed on the resin layer.

In general, the fluorescent material such as $CaWO_4$ is mixed in a binder resin such as polyvinyl butyral. To the mixture, an organic solvent is added to prepare a fluorescent material coating paint and applied on the resin layer with a knife coater or a roll coater and dried to form the fluorescent material layer.

In addition to $CaWO_4$, as the fluorescent material, terbium-activated rare earth metal sulfates (e.g. $Gd_2O_2SiTb$, $La_2O_2SiTb$ and $Y_2O_2SiTb$ fluorescent materials), terbium-activated rare earth metal-tantalum complex oxide fluorescent materials, and the like can be used.

Examples of the binder resin are polyvinyl butyral, nitrocellulose, cellulose acetate, polyester, polyvinyl acetate, and the like.

Examples of the organic solvent to be used in the preparation of the fluorescent material coating paint are ethanol, methyl ethyl ketone, ethyl acetate, toluene, and the like.

If desired, the fluorescent material coating paint may contain a dispersant (e.g. phthalic acid, stearic acid, etc.), a plasticizer (e.g. triphenyl phosphate, phthalic diester, etc.) and the like.

A thickness of the fluorescent material layer is from 50 to 2000 μm, preferably from 100 to 500 μm.

Because of the above structure of the sensitized paper of the present invention, the adhesion between the polyester film substrate and the coating layer containing the water-soluble or water-dispersible resin, between the coating layer and the resin layer, and between the resin layer and the fluorescent material layer is strengthened, and as the result, the adhesion between the polyester film substrate and the fluorescent material layer is improved, so that the fluorescent material layer is not peeled off when the sensitized paper is folded.

The sensitized paper of the present invention preferably has a protective layer on the fluorescent material layer.

To form the protective layer, a suitable resin is dissolved in a solvent to prepare a solution and applied on the fluorescent material layer and dried, or a film of a protective resin is separately prepared and laminated on the fluorescent material layer.

Examples of the resin of the protective layer are cellulose derivatives (e.g. cellulose acetate, nitrocellulose, cellulose acetate butyrate, etc.), polyvinyl chloride, polyvinyl acetate, vinyl chloride-vinyl acetate copolymer, polycarbonate, polyvinyl butyral, polymethyl methacrylate, polyvinyl formal, polyurethane, and the like. Among the protective layers, a polyester film such as a polyethylene terephthalate film is preferred. A particularly preferred film is a polyester film to which an antistatic property is imparted by compounding an antistatic agent therein or coating an antistatic agent on the surface of the film.

A thickness of the protective layer is usually from 0.5 to 50 μm, preferably from 1 to 25 μm.

PREFERRED EMBODIMENTS OF THE INVENTION

The present invention will be illustrated by the following Examples, in which "parts" are by weight.

In Examples, the properties were evaluated as follows:

Center line average surface roughness (Ra)

Using a surface roughness tester (SE-3F manufactured by Kosaka Kenkyusho, Ltd.), the center line average roughness is measured according to JIS B-0601-1976, with necessary modifications. The measuring conditions are the use of a contact needle having having a tip radius of 2 μm, 30 mg of probe contact pressure, 0.08 mm of cutoff, and 2.5 mm of a measuring length.

The measurement is performed at 10 points on the film and the measured values were averaged.

Evaluation of adhesion

Adhesion of the fluorescent material layer (1)

On the both surfaces of the fluorescent material layer, a pair of adhesive tapes (manufactured by Nichiban having a width of 18 mm) are adhered for a length of 7 cm without leaving any air bubbles. After applying a load of 3 kg using a hand roll, the adhesive tapes are peeled off in the 180 degree direction quickly. Then, the adhesion of the fluorescent material layer is evaluated according to the following criteria:

5: No peeling off.
4: 10% or less being peeled off.
3: 10 to 50% being peeled off.
2: More than 50% being peeled off.
1: Completely peeled off.

Adhesion of the fluorescent material layer (2).

From the prepared sensitized paper, a sample of 100 mm in width and 150 mm in length is cut out and folded along the center line at an angle of 90°. Then, the peeled off state of the fluorescent material layer is observed and evaluated according to the following criteria:

O: The fluorescent material layer is not cracked or peeled off.
Δ: The fluorescent material layer is cracked.
×: The fluorescent material layer is peeled off.

EXAMPLE 1

A mass of polyethylene terephthalate having an intrinsic viscosity of 0.65 and containing 10% by weight of titanium oxide particles with an average particle size of 0.3 μm was melt extruded at a temperature of 280° to 300° C. and casted on a cooling drum using an electrostatic adhesion method to form an amorphous film having a thickness of 2640 μm. The film was then oriented in the machine direction at a draw ratio of 3.2 at 95° C.

On one surface of the uniaxially oriented film, there was applied a coating composition comprising a water-dispersible styrene-butadiene copolymer (Nipole LX-32A (trade name) manufactured by Nippon Zeon Co., Ltd.) (40 parts in terms of the solid content. The same hereinafter), a water-soluble polyester resin (Finetex ES-670 (trade name) manufactured by Dainippon Ink Chemicals Co., Ltd.) (20 parts) and methylated melamine resin (10 parts), and the film was orientated in the cross direction at a draw ratio of 3.3 at 110° C., followed by heat treatment at 210° C. to obtain a white film having a thickness of 250 μm and carrying a coating layer having a thickness of 0.1 μm.

On the coating layer, there was formed a resin layer containing a polyester resin (Polyester TP-236 (trade name) manufactured by Nippon Synthetic Chemical Co., Ltd.) (10 parts) and silica particles (Sailoid 72 (trade name) manufactured by Fuji Devison Chemical Co., Ltd.) (1 part) and having a thickness of 5 μm.

Thereafter, on the resin layer, the fluorescent material layer having a dry thickness of 200 μm was formed by applying a coating paint having the following composition with a doctor blade and drying it at 100° C. for 10 minutes:

| Component | Parts |
|---|---|
| $CaWO_4$ fluorescent material | 100 |
| Polyvinyl butyral | 12 |
| Toluene | 20 |

-continued

| Component | Parts |
|---|---|
| Methyl ethyl ketone | 20 |

On the fluorescent material layer, a protective layer paint which had been prepared by dissolving cellulose acetate in a solvent was applied to a dry thickness of 9 μm and dried to form a protective layer, whereby-a sensitized paper was obtained.

The obtained synthesized paper was subjected to the above adhesion evaluation tests. The fluorescent material layer was not peeled off. When the sensitized paper was folded, the fluorescent material layer was not peeled off.

The resin layer had Ra of 0.52 μm and the coating processability of the fluorescent material layer was good.

EXAMPLE 2

In the same manner as in Example 1 except that a coating composition containing the following components was used, a sensitized paper was prepared:

| Component | Parts |
|---|---|
| Water-dispersible polyurethane resin (AP-30 manufactured by Dainippon Ink Chemical Co., Ltd.) | 60 |
| Water-dispersible polyester resin (RZ-124 manufactured by Goo Chemical Co., Ltd.) | 25 |
| Methyloled melamine | 10 |
| Silica gel (Snowtex YL manufactured by Nissan Chemical Co., Ltd.) | 5 |

EXAMPLE 3

In the same manner as in Example 1 except that a resin layer-having the following composition was formed, a sensitized paper was prepared:

| Component | Parts |
|---|---|
| Polyester-grafted polyacrylate (Pesresin 110 G manufactured by Takamatsu Fat and Oil Co., Ltd. having a solid content of 25% by weight) | 35 |
| Silica particles (Sailoid 72 manufactured by Fuji Devison Co., Ltd.) | 1 |

EXAMPLE 4

In the same manner as in Example 1 except that a resin layer was formed from a polyester resin (Polyester TP-manufactured by Nippon Synthetic Chemical Co., Ltd.), a sensitized paper was prepared.

EXAMPLE 5

In the same manner as in Example 1 except that a resin layer having the following composition was formed, a sensitized paper was prepared:

| Component | Parts |
|---|---|
| Polyester resin (Polyester TP-220 manufactured by Nippon Synthetic Chemical Co., Ltd.) | 10 |
| Silica particles (Sailoid 72 manufactured by Fuji Devison Co., Ltd.) | 0.5 |

Comparative Example 1

In the same manner as in Example 1 except that neither the coating layer containing the water-dispersible resin nor a resin layer was formed, a sensitized paper was prepared.

Comparative Example 2

In the same manner as in Example 1 except that no coating layer containing the water-dispersible resin was formed, a sensitized paper was prepared.

Comparative Example 3

In the same manner as in Example 1 except that no resin layer was formed, a sensitized paper was prepared.

The properties of the sensitized papers prepared in Examples and Comparative Examples are shown in the Table.

TABLE

| Example No. | Ra of the resin layer (μm) | Adhesion of fluorescent material Method (1) | Adhesion of fluorescent material Method (2) | Workability |
|---|---|---|---|---|
| 1 | 0.52 | 5 | ○ | Good |
| 2 | 0.50 | 5 | ○ | Good |
| 3 | 0.55 | 5 | ○ | Good |
| 4 | 0.005 | 5 | ○ | Fair |
| 5 | 0.32 | 5 | ○ | Good |
| Comp. 1 | — | 1 | X | — |
| Comp. 2 | 0.51 | 2 | Δ | Good |
| Comp. 3 | — | 2 | X | — |

What is claimed is:

1. A radiation sensitized paper comprising a polyester film, a coating layer which comprises a water-soluble or water-dispersible resin and is formed on a surface of said polyester film, a resin layer which is formed on said coating layer and a fluorescent material layer which is formed on said resin layer.

2. The radiation sensitized paper according to claim 1, wherein said water-soluble or water-dispersible resin is at least one resin selected from the group consisting of starch, methylcellulose, hydroxycellulose, alginic acid, gum arabic, gelatin, polysodium acrylate, polyacrylamide, polyvinyl alcohol, polyethylene oxide, polyvinylpyrrolidone, urethane resin, acrylic resin, polyamide resin, ether resin, epoxy resin, ester resin, styrene-butadiene copolymer and acrylonitrile-butadiene copolymer.

3. The radiation sensitized paper according to claim 1, wherein said coating layer has a thickness of 0.01 to 5 μm.

4. The radiation sensitized paper according to claim 1, wherein said resin layer has a thickness of 0.1 to 50 μm.

5. The radiation sensitized paper according to claim 1, wherein said resin layer has a center line average surface roughness of 0.01 to 2 μm.

6. The radiation sensitized paper according to claim 1, wherein said fluorescent material layer contains $CaWO_4$ as a fluorescent material.

7. The radiation-sensitized paper according to claim 1, wherein the polyester film comprises a polyester which is prepared by polycondensation of an aromatic dicarboxylic acid or its ester with a glycol.

8. The radiation-sensitized paper according to claim 1, wherein the water-soluble or water-dispersible resin comprises at least one of an acrylic resin, a urethane resin, a polyester resin, or a styrene-butadiene copolymer.

9. The radiation-sensitized paper according to claim 1, wherein the polyester film is biaxially oriented.

10. The radiation-sensitized paper according to claim 1, wherein the coating layer is applied on each surface of the polyester film.

11. The radiation-sensitized paper according to claim 1, wherein the resin layer comprises one or more of polyvinyl butyral, polyvinyl acetal, polyester, polyester-grafted polyacrylate, nitrocellulose, cellulose acetate, polyurethane, or vinyl chloride-vinyl acetate copolymer.

12. The radiation-sensitized paper according to claim 1, wherein the resin layer comprises inorganic particles to improve the blocking and slipping properties of the resin layer.

13. The radiation-sensitized paper according to claim 1, wherein the fluorescent material layer comprises a fluorescent material and a binder resin.

14. The radiation-sensitized paper according to claim 13, wherein the fluorescent material is selected from one or more of $CaWO_4$, a terbium-activated rare earth metal sulfate, and a terbium-activated rare earth metal-tantalum complex oxide and wherein the binder is at least one of polyvinyl butyral, nitrocellulose, cellulose acetate, polyester, and polyvinyl acetate.

15. The radiation-sensitized paper according to claim 1, wherein the thickness of the fluorescent material layer is from 50 to 2000 micrometers.

16. The radiation-sensitized paper according to claim 1, further comprising a protective layer containing a resin on the fluorescent material layer.

17. The radiation-sensitized paper according to claim 1, wherein the coating layer comprises a crosslinking agent.

18. A radiation-sensitized paper comprising a polyester film, a coating layer which comprises a water-soluble or water-dispersible resin and is formed on a surface of said polyester film, a resin layer which is formed on said coating layer and a fluorescent material layer which is formed on said resin layer, wherein said polyester film contains a light-absorbing material.

19. A radiation-sensitized paper comprising a polyester film, a coating layer which comprises a water-soluble or water-dispersible resin and is formed on a surface of said polyester film, a resin layer which is formed on said coating layer and a fluorescent material layer which is formed on said resin layer, wherein said polyester film contains a light-reflecting material.

20. A radiation-sensitized paper comprising a polyester film, a coating layer which comprises a water-soluble or water-dispersible resin and is formed on a surface of said polyester film, a resin layer which is formed on said coating layer and a fluorescent material layer which is formed on said resin layer, wherein said polyester film contains a light-reflecting material selected from the group consisting of titanium dioxide, calcium carbonate, and barium carbonate, or contains carbon black as a light-absorbing material.

* * * * *